(12) United States Patent
Stibich et al.

(10) Patent No.: US 11,577,792 B2
(45) Date of Patent: Feb. 14, 2023

(54) CARGO BOX REINFORCEMENT SYSTEM

(71) Applicants: Paul R Stibich, Troy, MI (US); Liam McGuirk, Rochester Hills, MI (US); Pablo A. Gutierrez, Rochester Hills, MI (US); Congyue Wang, Auburn Hills, MI (US); Michael Okuniewicz, Rochester, MI (US); Luke T Douma, Holly, MI (US)

(72) Inventors: Paul R Stibich, Troy, MI (US); Liam McGuirk, Rochester Hills, MI (US); Pablo A. Gutierrez, Rochester Hills, MI (US); Congyue Wang, Auburn Hills, MI (US); Michael Okuniewicz, Rochester, MI (US); Luke T Douma, Holly, MI (US)

(73) Assignee: FCA US LLC, Auburn Hills, MI (US)

( * ) Notice: Subject to any disclaimer, the term of this patent is extended or adjusted under 35 U.S.C. 154(b) by 103 days.

(21) Appl. No.: 17/164,939

(22) Filed: Feb. 2, 2021

(65) Prior Publication Data

US 2021/0237807 A1 Aug. 5, 2021

Related U.S. Application Data

(60) Provisional application No. 62/969,947, filed on Feb. 4, 2020.

(51) Int. Cl.
*B62D 33/023* (2006.01)
*B62D 25/20* (2006.01)
*B62D 33/027* (2006.01)

(52) U.S. Cl.
CPC ..... *B62D 33/0273* (2013.01); *B62D 25/2054* (2013.01); *B62D 33/023* (2013.01)

(58) Field of Classification Search
CPC .... B62D 25/08; B62D 25/20; B62D 25/2054; B62D 27/02; B62D 27/023; B62D 33/02; B62D 33/023; B62D 33/0273; B60P 7/0807
USPC ............................ 296/183.1, 100.17, 100.18
See application file for complete search history.

(56) References Cited

U.S. PATENT DOCUMENTS

| | | | | |
|---|---|---|---|---|
| 4,405,170 A | * | 9/1983 | Raya ......................... | B60P 3/42 296/105 |
| 5,165,750 A | * | 11/1992 | Pirhonen ................... | B60J 7/104 296/100.18 |
| 5,660,427 A | * | 8/1997 | Freeman ................. | B62D 33/02 296/183.1 |
| 6,742,832 B1 | * | 6/2004 | Miskech ................. | B62D 33/02 216/36 |
| 7,281,889 B2 | | 10/2007 | Anderson et al. | |
| 7,588,285 B2 | | 9/2009 | Mohammed | |

(Continued)

*Primary Examiner* — Gregory A Blankenship
(74) *Attorney, Agent, or Firm* — Ralph E. Smith

(57) ABSTRACT

A cargo box (10) reinforcement system (20) includes an upper front panel reinforcement (22) securable to a cargo box front panel (18) and side wall panels (14, 16). The system (20) including a pair of side reinforcements (24, 26). Each side reinforcement (24, 26) is securable to one side of the pair of side panels (14, 16) of the cargo box (10). Each side reinforcement (24, 26) is secured with an end (40) of the upper front panel reinforcement (22). Also, the system (20) includes a pair of gussets (28, 30). Each gusset (28, 30) is coupled with the upper front panel reinforcement (22) and one of the pair of side reinforcements (24, 26).

4 Claims, 3 Drawing Sheets

(56) References Cited

U.S. PATENT DOCUMENTS

| | | |
|---|---|---|
| 7,665,800 B2 | 2/2010 | Werner |
| 9,145,176 B1 | 9/2015 | Van Wyk et al. |
| 2003/0001409 A1* | 1/2003 | Semple .................. B62D 33/02 |
| | | 296/183.1 |
| 2004/0119314 A1* | 6/2004 | Haack ...................... B60J 7/102 |
| | | 296/100.18 |
| 2007/0046056 A1 | 3/2007 | Delaney et al. |
| 2014/0284956 A1* | 9/2014 | McBride .............. B62D 33/023 |
| | | 296/36 |
| 2021/0237807 A1* | 8/2021 | Stibich ............... B62D 25/2054 |
| 2022/0017154 A1* | 1/2022 | Hewitt .................. B62D 25/04 |
| 2022/0194311 A1* | 6/2022 | Nava Reyes .......... B62D 33/02 |

* cited by examiner

CARGO BOX REINFORCEMENT SYSTEM

CROSS-REFERENCE TO RELATED APPLICATION

This application claims the benefit of U.S. Provisional Application No. 62/969,947, filed on Feb. 4, 2020. The entire disclosure of the above application is incorporated herein by reference.

FIELD

The present disclosure relates to vehicles and, more particularly, to a cargo box reinforcement.

BACKGROUND

When a multi-functional tailgate is attached to a cargo box, the additional weight and degrees of freedom present numerous durability and load carrying issues for the cargo box. Thus, due to the additional weight and stress on the cargo box, it is desirable to stiffen and provide more durability to the cargo box.

According to the present disclosure, a reinforcement system is added to the cargo box to resolve these issues. The present disclosure provides a reinforcement for the front upper corner portion of the cargo box. This increases the dynamic stiffness by 3.5 Hz. Thus, the present disclosure provides a reinforcement on the front upper corners of the cargo box to resolve a component added to the rear of the cargo box. This is a non-intuitive solution and does not require modification of an original production cargo box design.

SUMMARY

An object of the disclosure is a cargo box reinforcement system comprising an upper front panel reinforcement securable to a cargo box front panel. A pair of side reinforcements is securable, one on each side, to the sides of the cargo box. Also, the side reinforcements are secured with ends of the upper front panel reinforcement forming an angle between the two. A pair of gussets, one at each angle, is coupled with the upper front panel reinforcement and one of the side reinforcements. The gussets are bolted to the upper front panel reinforcement and the side reinforcements. A tie down may also be coupled with gussets.

According to an additional embodiment of the disclosure, a vehicle cargo box comprises a floor deck with a pair of side walls and a front wall panel extending from the floor deck. An open end, opposing the front wall panel, receives a tailgate. An upper front panel reinforcement is secured to the front wall panel. A pair of side reinforcements is securable, one on each side, to the side walls of the cargo box. Also, the side reinforcements are secured with ends of the upper front panel reinforcement forming an angle between the two. A pair of gussets, one at each angle, is coupled with the upper front panel reinforcement and one of the side reinforcements. The gussets are bolted to the upper front panel reinforcement and the side reinforcements. A tie down may also be coupled with gussets.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
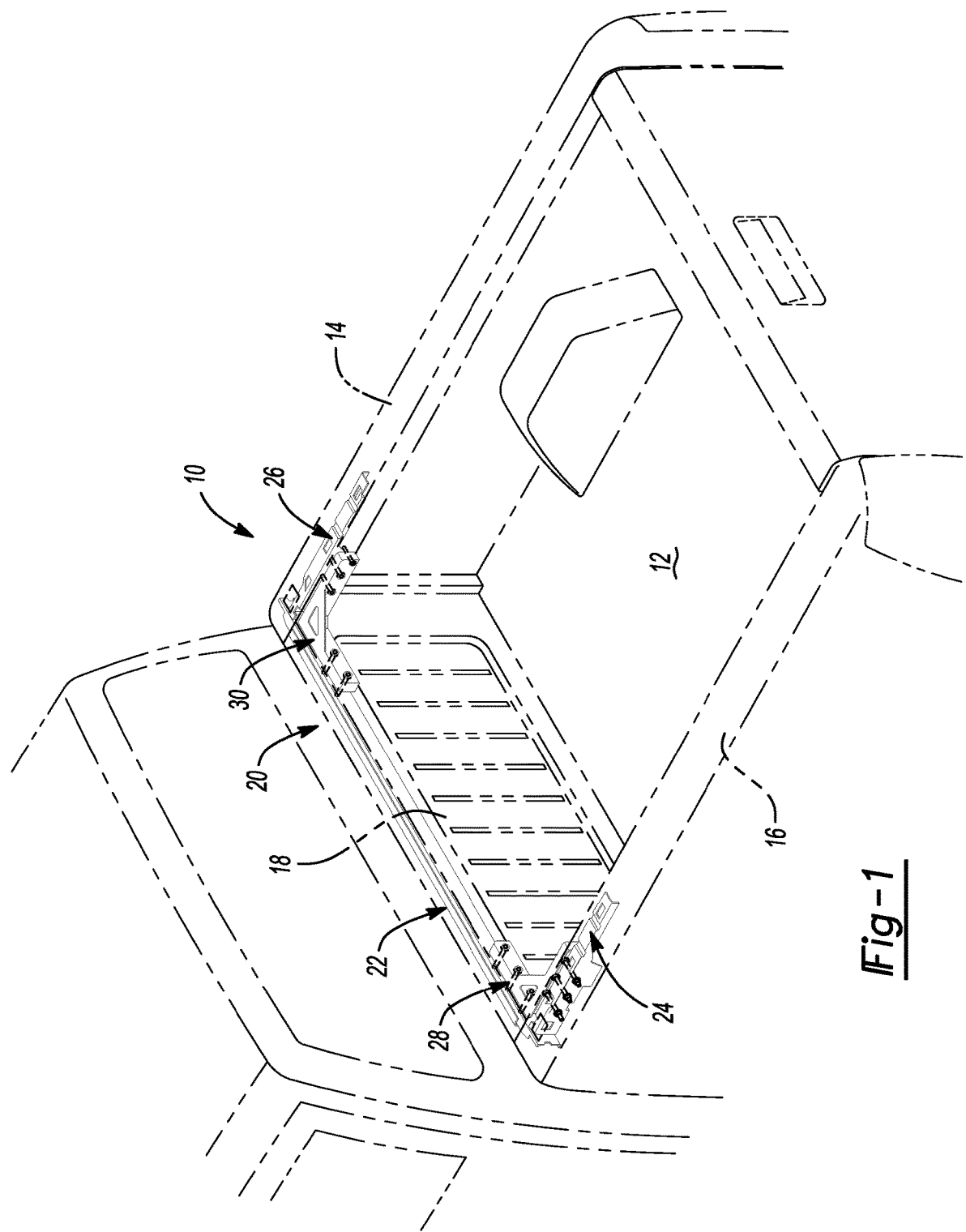
FIG. 1 is a perspective view of a cargo box with the reinforcement system.
Figure 2:
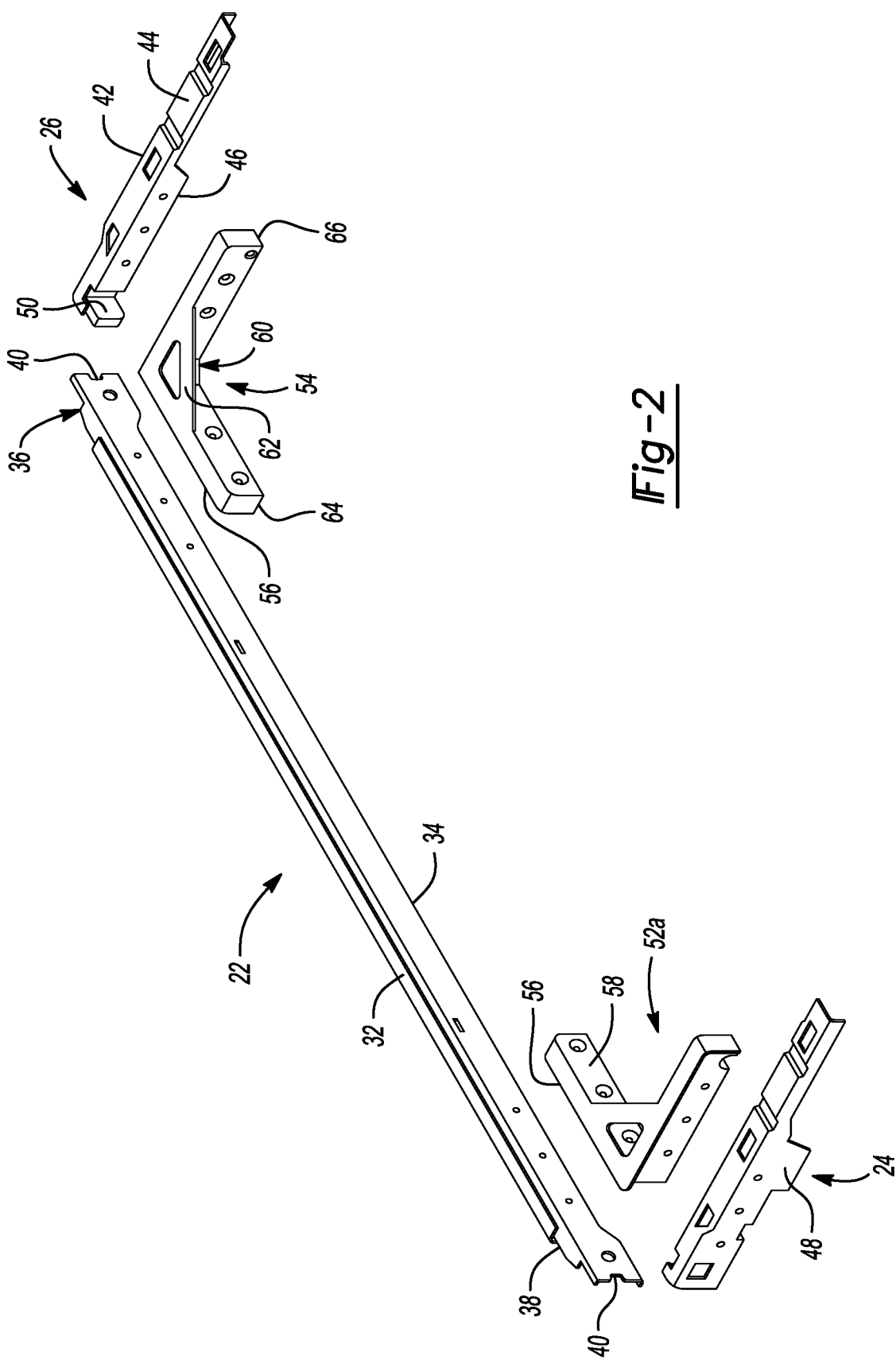
FIG. 2 is an exploded perspective view of the reinforcement system.
Figure 3:
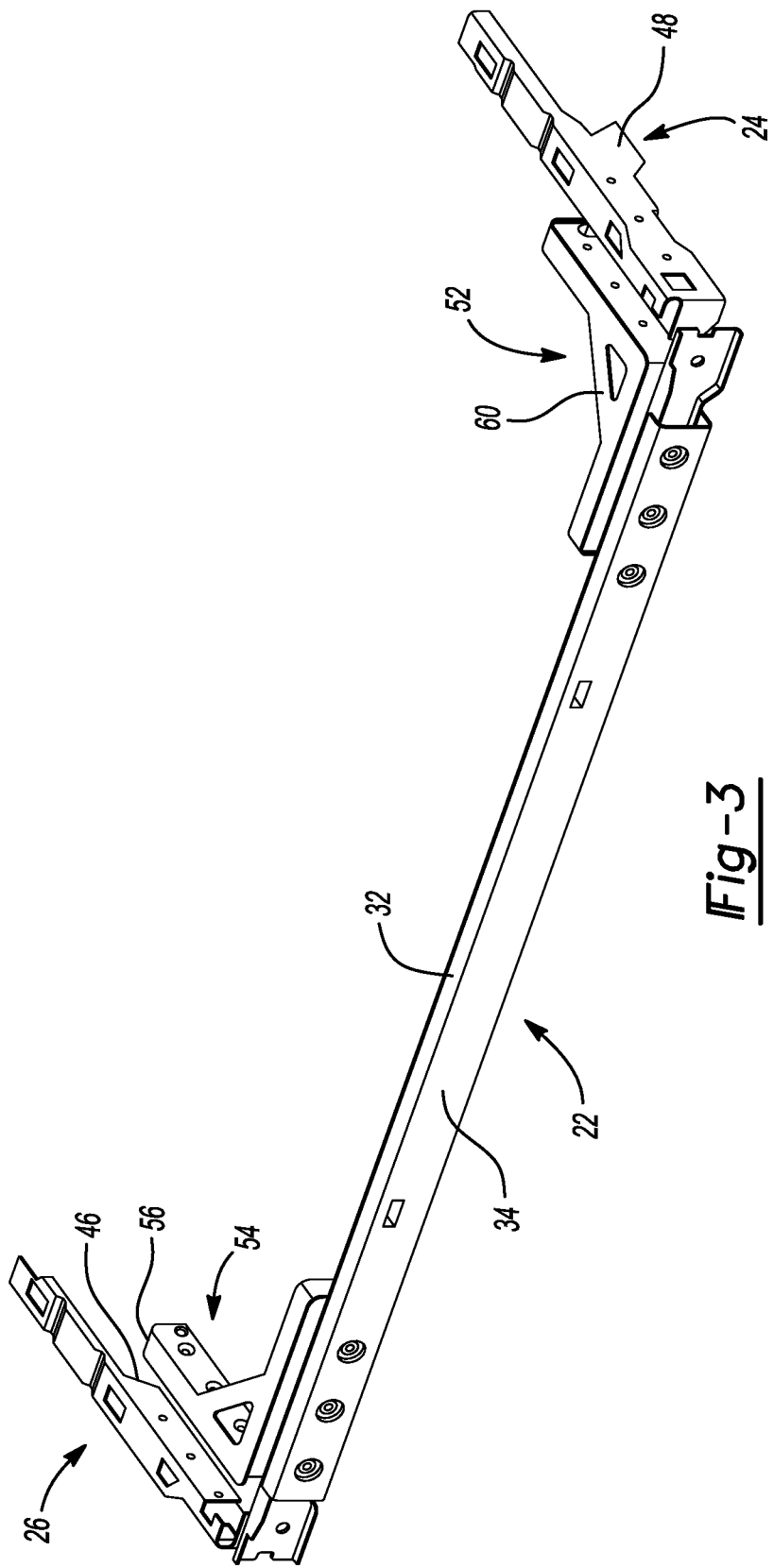
FIG. 3 is a rear exploded perspective view like FIG. 2.

Turning to FIG. 1, a vehicle cargo box is illustrated and designated with the reference numeral 10. The cargo box 10 includes a floor deck 12 with a pair of side walls 14, 16 as well as a front wall panel 18. The rear of the cargo box is illustrated as being open to receive a tailgate.

A reinforcement system 20 is illustrated on the upper front wall panel 18 and side panels 14, 16. The reinforcement system 20 includes an upper panel reinforcement 22, side panel reinforcements 24, 26 as well as gussets 28, 30.

The upper front panel reinforcement 22 has an elongated rail shape with a top shelf 32 and a sidewall 34. This forms a L-shaped rail that enables the upper front panel reinforcement 22 to place onto a ledge of the front upper wall panel and be welded, adhesively glued or the like to it. Generally, the upper front panel reinforcement 22 is welded to the ledge and front wall along its L-shape inside the front wall panel 18. Additionally, the rail includes ends 36, 38. The ends 36, 38 include a receiving portion 40. The receiving portions 40 receive ends of the side panel reinforcements 24, 26.

The side reinforcements 24, 26 have a body 42 with a top wall 44 and a pair of extending side walls 46, 48. A U-shape is formed with the top wall or web 44 and the side walls 46, 48. The U-shape enables the side reinforcements 24, 26 to be positioned and secured onto a ledge surface and front wall of the cargo box side walls 14, 16. The top wall 44 is welded and/or adhesively glued to the ledge inside the side wall 14, 16 of cargo box. The side wall 46 is welded and/or adhesively glued to the front wall of the cargo box side wall 14, 16. Additionally, the side panel reinforcements 24, 26 include a projection 50. The projection 50 inserts into the receiving sockets of end portions 40. Thus, the reinforcements 22, 24, 26 are positioned and secured together inside the front and side wall panels 14, 16. The reinforcements 22, 24, and 26 are thus secured, welded or glued with one another and to the front panel 18 and side wall panels 14, 16.

Gussets 28, 30 are positioned at the intersections, or right angles, of the upper panel reinforcement member 22 and the side panel reinforcements 24, 26 on the external wall surface of the cargo box. The gussets 28, 30 have an L-shape and are bolted with the upper panel reinforcement 22 as well as the side reinforcements 24, 26. The bolt passes through the cargo box sheet wall and both side walls 46, 48 of the body of the side reinforcements 24, 26. The gussets 28, 30 include a shelf 56 that is positioned on the external ledge of the cargo box front wall panel 18, and side wall panels 14, 16. This provides additional reinforcement when the gussets 28, 30 are secured with the upper panel reinforcement 22 and side panel reinforcements 24, 26 as seen in FIG. 1. Additionally, the sidewall 58 abuts against an external surface of a front wall of the side panels 14, 16 and the external surface of the front wall of the front panel 18. Thus, the gusset 28, 30, while having the overall L-shape, also have an L-shape in cross section.

A tie down 60 is included with the gussets 28, 30. The tie down 60 has a bar shape 62. The bar shape 62 extends between the legs 64, 66 of the gussets 28, 30.

The tie downs 60 provide exceptional strength in an upper front corner location of the cargo bed where tie downs are typically not provided. The tie downs 60 provide well over a 3000 lb. force capability with no deflection of the base cargo box sheet metal. This is compared with typical cargo box tie downs that provide approximately 200 to 600 lbs force capability. Typical high/low tie downs are located at the lower four corners of the cargo box just above the cargo box floor. The present reinforcement system does not require any modification to the original production of the cargo box design. The reinforcement system provides 3.5 Hz of dynamic stiffness and aids in the resolution of the load carrying and durability issues.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A cargo box reinforcement system comprising:
   an upper front panel reinforcement securable to a cargo box front panel;
   a pair of side reinforcements, each side reinforcement securable to one side of the cargo box, and each side reinforcement includes an end that secures with an end of the upper front panel reinforcement;
   a pair of gussets, each gusset coupled with the upper front panel reinforcement and one of the side reinforcements; and
   a tie down on the gussets.

2. The cargo box reinforcement system of claim 1, wherein the gussets are each bolted to the upper front panel reinforcement and one of side reinforcements.

3. A vehicle cargo box comprising:
   a floor deck with a pair of side panels and a front wall panel that extend from the floor deck and an open end opposing the front wall panel for receiving a tailgate; and
   an upper front panel reinforcement on the cargo box front wall panel;
   a pair of side reinforcements, each side reinforcement on one of the pair of side panels of the cargo box, and each side reinforcement including an end coupled with an end of the upper front panel reinforcement;
   a pair of gussets, each gusset coupled with the upper front panel reinforcement and one of the pair of side reinforcements; and
   a tie down on each of the gussets.

4. The cargo box reinforcement system of claim 3, wherein the gussets are each bolted to the upper front panel reinforcement and one of the side reinforcements.

* * * * *